United States Patent [19]

Hancock et al.

[11] 4,374,263

[45] Feb. 15, 1983

[54] PROCESS FOR THE PRODUCTION OF ESTERS IN THE PRESENCE OF A HETEROGENEOUS ESTERIFICATION CATALYST

[75] Inventors: Ronald D. Hancock, Weybridge; Robert Mackison, Epsom, both of England

[73] Assignee: The British Petroleum Company Limited, London, England

[21] Appl. No.: 200,558

[22] Filed: Oct. 24, 1980

[30] Foreign Application Priority Data

Oct. 27, 1979 [GB] United Kingdom ................. 7937331

[51] Int. Cl.$^3$ .............................................. C07C 67/08
[52] U.S. Cl. .................... 560/204; 252/428; 252/449; 252/457; 560/64; 560/67; 560/75; 560/94; 560/99; 560/100; 560/101; 560/103; 560/105; 560/106; 560/127; 560/128; 560/130; 560/146; 560/193; 560/220; 560/231; 560/254; 560/261; 560/263; 560/265

[58] Field of Search .................. 560/64, 67, 75, 94, 560/99, 100, 101, 103, 105, 106, 127, 128, 130, 146, 193, 204, 220, 231, 254, 261, 263, 265; 252/449, 455 R, 457, 455 Z, 461, 462, 463, 475, 428

[56] References Cited

U.S. PATENT DOCUMENTS

| | | | |
|---|---|---|---|
| 2,405,842 | 8/1946 | Magrane et al. | 560/95 |
| 2,411,136 | 11/1946 | Luce | 560/99 X |
| 2,910,489 | 10/1959 | Bond | 560/204 X |
| 3,287,402 | 11/1966 | Landis | 560/95 X |
| 3,364,251 | 1/1968 | Benning et al. | 560/204 X |
| 4,056,488 | 11/1977 | Mitchell et al. | 252/449 |

Primary Examiner—Natalie Trousof
Assistant Examiner—Vera C. Clarke
Attorney, Agent, or Firm—Brooks, Haidt, Haffner & Delahunty

[57] ABSTRACT

The invention relates to an esterification process employing as a heterogeneous catalyst an inorganic oxide, e.g. silica, to which there is bonded by reaction with surface hydroxyl groups a sulphonic acid-functionalized silane.

9 Claims, No Drawings

PROCESS FOR THE PRODUCTION OF ESTERS IN THE PRESENCE OF A HETEROGENEOUS ESTERIFICATION CATALYST

The present invention relates to a process for the production of esters in the presence of novel heterogeneous esterification catalysts.

A variety of catalysts have been employed in the production of esters. Thus strong mineral acids such as sulphuric acid and organic acids such as para-toluene sulphonic acid have been used extensively. Problems sometimes encountered in the production of esters using strong mineral acid catalysts include colouration of the ester product and acid contamination of both the ester product and the excess alcohol used in its preparation. These problems are said to be alleviated to some extent by the use of amphoteric catalysts, such as certain titanium compounds as described for example in British Patent Specification Nos. 852,110, 886,750, 1,058,242, 1,061,173, 1,070,914 and 1,246,346 and stannous oxalate as described in British Patent Specification No. 990,297. Nevertheless it is still generally necessary, at least in the production of less volatile esters, to remove the catalyst from the product by means other than distillation. This is usually achieved by neutralisation followed by filtration of the product to remove the neutralisation residues. Such treatment destroys the catalytic activity of the material and prevents its direct re-use in the process.

We have now found that inorganic solids having bonded to their surface by reaction with hydroxyl groups present thereon a sulphonic acid functionalised silane are effective catalysts for the production of esters and moreover that they can be recovered and re-used as catalysts in the esterification process.

Thus according to the present invention there is provided a process for the production of esters which process comprises reacting under esterification reaction conditions a carboxylic acid or an anhydride thereof with an alcohol or a phenol or a derivative thereof in the presence of a catalytically effective amount of an inorganic oxide having bonded to the surface thereof by reaction with surface hydroxyl groups present thereon the group

$$\equiv Si-R-CH_2SO_3H \qquad (I)$$

wherein R is a divalent radical containing up to 20 carbon atoms and at least one of the unsatisfied valencies of the silicon atom is linked to the inorganic oxide, the remainder, if any, being satisfied by either halogen atoms, or organic radicals containing up to 20 carbon atoms or hydrolysis products thereof.

Suitable carboxylic acids, or their anhydrides, which may be used in the process of the invention include:
monobasic acids containing up to 20 carbon atoms e.g. alkanoic acids such as myristic, palmitic and stearic acids;
alkenoic acids such as oleic acid;
derivatives of such alkanoic and alkenoic acids, such as ricinoleic acid;
aliphatic dibasic acids containing from 3 to 20, preferably from 3 to 10 carbon atoms, such as adipic, azelaic and sebacic acids;
tribasic aliphatic acids such as citric acid;
monobasic aromatic acids, suitably those containing up to 10 carbon atoms, e.g. benzoic acid;
dibasic aromatic acids such as phthalic acid, and tribasic aromatic acids such as hemimellitic, trimellitic and trimesic acids;

Suitable alcohols and phenols which may be used in the process of the present invention include:
monohydric alcohols containing up to 20 carbon atoms, preferably alkanols containing from 2 to 14 carbon atoms, e.g. ethanol, butanol, isoheptanol, iso-octanol, 2-ethylhexanol, nonanol, decanol, tridecanol and mixtures of alcohols, containing for example 7 to 9 carbon atoms such as are obtained from hydroformylation of olefinic feedstocks;
dihydric alcohols containing up to 20 carbon atoms, e.g. monoethylene glycol, diethylene glycol, triethylene glycol, mono-, di- and tri-propylene glycol, the butylene glycols and 2,2,4-trimethyl pentane diol;
trihydric alcohols such as glycerol, pentaerythritol and dipentaerythritol;
aliphatic cyclic alcohols containing up to 10 carbon atoms such as cyclohexanol;
derivatives, preferably ether derivatives, of dihydric and trihydric alcohols, e.g. a lower alkyl ether derivative such as 2-butoxy ethanol;
aromatic alcohols, e.g. benzyl alcohol;
monohydric phenols containing up to 10 carbon atoms such as phenol itself, and
dihydric phenols such as catechol, resorcinol, hydroquinone and pyrogallol.

With regard to the catalyst suitable inorganic oxides having surface hydroxyl groups include alumina, titania, zirconia, glass, sepiolite and zeolite molecular sieves. Preferably the inorganic oxide is silica and more preferably it is silica gel. In addition mixtures of inorganic oxides may be used. Unless they have been subjected to severe treatment, e.g. heating above 1000° C., commercially available silicas may be used.

Suitably the unsatisfied valencies on the silicon atom in the group of formula (I) which are not linked to the inorganic oxide may be satisfied by halogen atoms, alkyl, aryl, aryloxy or alkoxy radicals or hydrolysis products thereof and may be the same or different. Preferably they are alkoxy radicals containing from 1 to 3 carbon atoms or hydrolysis products thereof. Even more preferably they are identical. Preferably the group R is an alkylene group containing up to 6 carbon atoms, most preferably a di- or tri-methylene group. A particularly suitable group having the formula (I) is the group

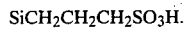

$$SiCH_2CH_2CH_2SO_3H.$$

With regard to the nature of the linkage between the inorganic oxide and the group of formula (I) it is believed to be constituted by an —O— group formed by the reaction of an —OH group on the surface of the inorganic solid with either a halogen atom or an organic radical containing up to 20 carbon atoms or a hydrolysis product thereof attached to the silicon atom in the group of Formula (I). Thus, for example the following reaction may occur:

Inorganic oxide —OH + Cl—Si—R—CH₂SO₃H Silica —O—Si—RCH₂SO₃H + HCl In theory it is possible to form three such linkages for each Si atom in the group of formula (I) but in practice it is thought that steric hindrance may well limit the maximum possible to two. However the true nature of the linkage is immaterial to the operation of the process of the present invention and it is not intended that any theory as to its nature, such as the foregoing, should in any way restrict the invention.

The catalyst may be prepared by a variety of methods known in the art. Thus British Patent Specification No. 1,460,315 discloses a process for the chemical modification of the surface of an inorganic substance containing hydroxyl groups, which comprises:
(a) treating the surface of said substance with an alkyl halosilane containing at least one alkyl group having 1 to 18 carbon atoms, said alkyl group optionally having a reactive halogen substituent, so that the alkyl halosilane reacts with hydroxyl groups on said surface to form —O—Si—R groups attached by the depicted oxygen atom to said surface, R being an alkyl group optionally having a reactive halogen substituent;
(b) where R does not have a reactive halogen substituent, introducing by halogenation or sulphochlorination a reactive halogen or sulphochloride substituent into the R group; and
(c) reacting said reactive halogen or sulphochloride substituent with a suitable compound to introduce into the alkyl group one or more of the following groups: sulphonic acid, amino, substituted amino, trialkyl ammonium, thiol, ether, thioether, hydroxyl, nitrile, nitro, carboxyl and hydrazine.

Another method of chemically modifying the surface of an inorganic solid having reactive hydroxyl groups thereon is disclosed in UK Patent Specification No. 1,506,226, which method comprises reacting, under dry conditions and in the presence of a primary amine or organic sulphonic acid catalyst, the surface of the said solid with an alkyl, aryl, or aralkyl-substituted alkoxysilane at least one of the said alkyl, aryl or aralkyl substituents containing one or more functional groups which are:

—SO$_3$H, —SH, —OH, —CN, —NO$_2$, —COOH,

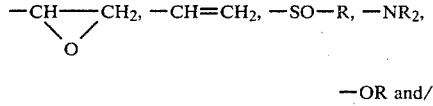

—OR and/or —SR wherein R is an alkyl group, whereby the said reactive hydroxyl groups react with the alkoxy groups of the said silane.

Preferably the catalyst is prepared by reacting an inorganic oxide containing surface hydroxyl groups in a first stage with a compound of formula (II)

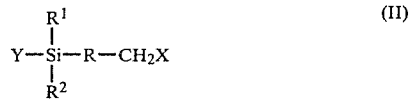

wherein R, R$^1$ and R$^2$ are as hereinbefore defined with reference to the formula (I), Y is a halogen atom or an alkoxy or aryloxy group containing up to 20 carbon atoms and X is a halogen atom; and reacting the product of the first stage in a second stage with an aqueous solution of a water soluble inorganic sulphite to form a sulphonate salt and reacting the sulphonate salt of the second stage with dilute mineral acid in a third stage to form a product containing sulphonic acid groups. Such a method is disclosed in the specification of our copending published European application No. 79301695.7 which is incorporated herein by reference.

Esterification reaction conditions are those conventionally employed in the art and will vary considerably depending upon the nature of the alcohol or phenol and acid or anhydride thereof reacted. Thus for the poduction of volatile esters of a primary alcohol and a carboxylic acid e.g. ethyl acetate, the reaction temperature may be greater than 80° C., preferably in the range from 110° to 160° C. and the pressure may be atmospheric. A conventional process for the production of such esters is described in the complete specification of UK Patent No. 1,173,089. For those esters forming heterogeneous azeotropes with water and having a lower boiling point than water, such as those formed from either ethanol, n-propanol, or iso-propanol and either acetic, propionic or butyric acid, the pressure is preferably superatmospheric, as described in the specification accompanying copending published European application No. 79301797.1. On the other hand in the production of less volatile esters, such as phthalate esters, it may be preferable to employ subatmospheric pressures and/or more elevated temperatures, for example up to 250° C. and/or use low-boiling hydrocarbon solvents as refluxing agents.

Generally it is advantageous to employ a stoichiometric excess of the alcohol or phenol. Up to 50% molar excess, preferably between 10 and 30% molar excess, of the alcohol or phenol over the carboxylic acid or anhydride may be used.

In those cases in which the ester product is too involatile to be removed by distillation the catalyst may be recovered by simple filtration. The catalyst may then be re-used without further treatment, or it may be washed, with for example absolute ethanol, before re-use.

The invention will now be illustrated by reference to the following Examples and Comparison Test.

EXAMPLE 1

(a) Preparation of Catalyst

Silica gel (80 g) was suspended in toluene (250 ml) and gammachloropropyltrimethoxysilane (40 ml) added. The reaction mixture was then stirred under nitrogen at reflux temperature for 5 hours. The silica product was isolated, Soxhlet extracted with methanol for 18 hours and vacuum dried. To this chloro-silica was added a saturated aqueous solution of sodium sulphite (800 ml) and the mixture was stirred and refluxed under nitrogen for 24 hours. After cooling the silica product was isolated and washed with distilled water to remove any residual sulphite. The silica was then acidified with 1 N nitric acid and finally washed with distilled water and vacuum dried. On analysis the silica was found to contain 0.7% weight sulphur. Hereinafter the product will be referred to as n-propylsulphonic acid-silica.

(b) Preparation of ester 2-ethyl hexanol (558 g), adipic acid (225 g) and n-propylsulphonic acid-silica (10 g) prepared as in (a) above was charged to a 1-liter flange neck flask with multi neck lid surmounted by a glass column packed with Dixon gauzes (130×25 mm) and equipped with a condenser and decanter. The temperature of the flask was raised and the pressure reduced, the esterification reaction being carried out at a flask temperature of 140° to 150° C. and a pressure of 500 to 150 mbar. Water formed in the esterification was entrained out of the reaction mixture with the 2-ethyl hexanol, separated in the decanter, and the alcohol returned to the reaction flask. Reaction was continued until the residual acidity of the mixture fell to about 0.2% as adipic acid. The excess of 2-ethyl hexanol was removed under reduced pressure in the presence of the catalyst. The solid catalyst was then recovered by filtration through a No. 1 Whatman paper.

Esterification rate data and the results of colour measurements on the di-(2-ethyl hexyl) adipate ester product are given in the following Table.

EXAMPLE 2

The solid catalyst recovered in Example 1 (b) was washed with absolute ethanol and dried in an oven at 100° C. for about 30 minutes.

The catalyst was then re-charged to the reaction flask together with 2-ethyl hexanol and adipic acid in the same proportions as in Example 1 (b). Thereafter the procedure followed was the same as that employed in Example 1(b).

Esterification rate data and the results of colour measurements on the di-(2-ethyl hexyl) adipate ester product are given in the following Table.

EXAMPLE 3

Example 1 was repeated except that only 1.2 g of the n-propylsulphonic acid-silica catalyst was used.

Esterification rate data and the results of colour measurements on the di-(2-ethyl hexyl) adipate ester product are given in the following Table.

Comparison Test

The ester preparation procedure of Example 1(b) was repeated except that the n-propylsulphonic acid-silica was replaced by para-toluenesulphonic acid (0.8 g) as esterification catalyst.

Data on the rate of esterification and the results of colour measurements on the di-(2-ethyl hexyl) adipate ester product are given in the following Table.

This is not an example illustrating the process of the invention and is included only for the purpose of comparison.

TABLE

|  | EXAMPLE | | | Comparison Test |
|---|---|---|---|---|
|  | 1 | 2 | 3 |  |
| Concentration of catalyst (% w/w) | 1.2 | 1.2 | 0.1 | 0.1 |
| Time to completion of reaction (hours) | 6 | 6 | 20 | 2 |
| Colour of product as obtained (Lovibond 6" cell) | 12Y,3R | 12Y,3R | 4.1Y,1.3R | 25Y,4R |
| Colour of product after carbon treatment* (Lovibond 6" cell) |  |  | 3.0Y,0.5R | 8Y,2R |

*It is customary to include activated carbon in the charge for an esterification using para-toluenesulphonic acid catalyst to prevent excessive colour formation. In the Comparison Test this was not done in order to permit direct comparison with the product of Examples 1 to 3. However, in Example 3 and the Comparison Test the ester product was treated with activated carbon.

With reference to the above Table it can be seen from Example 3 that the rate of esterification using the n-propylsulphonic acids-silica catalyst is lower than the rate using a conventional mineral acid catalyst (Comparison Test using the same mass concentration of each catalyst). This is merely a reflection of the fact that the level of sulphonic acid grouping (—SO₃H) in n-propylsulphonic acid-silica is about 1.7% wt. while in para-toluenesulphonic acid it is 28% wt. When the effective concentration of —SO₃H grouping is increased (Examples 1 and 2) a considerable decrease in reaction time is observed. Recovery and re-use of the n-propylsulphonic acid-silica catalyst has no significant effect on the rate of the reaction (Examples 1 and 2).

In the presence of n-propylsulphonic acid-silica as catalyst at the same mass concentration as the conventional catalyst there is a marked improvement in the colour of the ester product (cf Example 3 and the Comparison Test). At higher concentrations of n-propylsulphonic acid-silica the reaction rate is increased. The colour of the ester product so produced is very much better than the product resulting from the use of para-toluenesulphonic acid and is comparable with such a product after carbon treatment. Re-use of the n-propylsulphonic acid-silica has no adverse effect on the colour of the ester product obtained therewith.

EXAMPLE 4 n-propylsulphonic acid-silica (2.03 g), prepared as described in Example 1(a), phthalic anhydride (100 g) and n-butanol (110 g) (5% excess on batch) were mixed in a flask fitted with a Dean and Stark trap. The temperature of the reaction mixture was raised gradually to 180° C. over a period of 7 hours at which time the residual acidity of the mixture had fallen to 11% and approximately the correct amount of water had been formed.

We claim:

1. A process for the production of esters which process comprises reacting under esterification reaction conditions a carboxylic acid or an anhydride thereof with an alcohol or a phenol or a derivative thereof in the presence of a catalytically effective amount of an inorganic oxide selected from the group consisting of silica, alumina, titania, zirconia, glass, sepiolite and zeolitic molecular sieves and having bonded to the surface thereof by reaction with surface hydroxyl groups present thereon the group:

$$\equiv Si-R-CH_2SO_3H \qquad (I)$$

wherein R is a divalent radical containing up to 20 carbon atoms and at least one of the unsatisfied valencies of the silicon atom is linked to the inorganic oxide, the remainder, if any, being satisfied by either halogen atoms or organic radicals containing up to 20 carbon atoms or hydrolysis products thereof.

2. A process according to claim 1 wherein the inorganic oxide is silica.

3. A process according to claim 2 wherein the silica is silica gel.

4. A process according to claim 1, 2 or 3 wherein the unsatisfied valencies on the silicon atom in the group of formula (I) which are not linked to the inorganic oxide are satisfied by either halogen atoms or alkyl, aryl, aryloxy or alkoxy radicals, or hydrolysis products thereof.

5. A process according to claim 1, 2 or 3 wherein the unsatisfied valencies on the silicon atom in the group of formula (I) which are not linked to the inorganic oxide are satisfied by alkoxy radicals containing from 1 to 3 carbon atoms or hydrolysis products thereof.

6. A process according to claim 1, 2 or 3 wherein the unsatisfied valencies are satisfied by identical radicals or halogen atoms.

7. A process according to claim 1, 2 or 3 wherein R in formula (I) is an alkylene group containing up to 6 carbon atoms.

8. A process according to claim 1, 2 or 3 wherein the group having the formula (I) is the group =SiCH$_2$CH$_2$CH$_2$SO$_3$H.

9. A process according to claim 1, 2 or 3 wherein the alcohol is 2-ethyl hexanol, the carboxylic acid is adipic acid and the ester so produced is di-(2-ethyl hexyl) adipate.

* * * * *